Sept. 3, 1968 H. G. BLANK 3,400,388

BINARY TO ALPHA-NUMERIC TRANSLATOR

Filed Sept. 17, 1965 2 Sheets-Sheet 1

INVENTOR.
HANS G. BLANK
BY R. J. Frank
ATTORNEY.

Sept. 3, 1968 H. G. BLANK 3,400,388

BINARY TO ALPHA-NUMERIC TRANSLATOR

Filed Sept. 17, 1965 2 Sheets-Sheet 2

INVENTOR.
HANS G. BLANK

BY R. J. Frank
ATTORNEY.

United States Patent Office 3,400,388

Patented Sept. 3, 1968

3,400,388

BINARY TO ALPHA-NUMERIC TRANSLATOR

Hans G. Blank, Bronx, N.Y., assignor to General Telephone and Electronics Laboratories, Inc., a corporation of Delaware Filed Sept. 17, 1965, Ser. No. 488,217

8 Claims. (Cl. 340—336)

ABSTRACT OF THE DISCLOSURE

A translator for converting a binary signal into a read-out signal for controlling the energization of an alpha-numeric display device is disclosed. The translator utilizes a matrix of controlled rectifiers (SCR) each of which is coupled in series with an individual element of the display. An additional matrix supplies current to the control electrodes of the SCR's in accordance with the binary signal. A third impedance matrix couples the cathodes of selected SCR's to ground through a low impedance path in accordance with the binary signal. The combination of the three matrices permits control of the elements of an alpha-numeric display with a relatively small number of electrical components.

Figure 1:
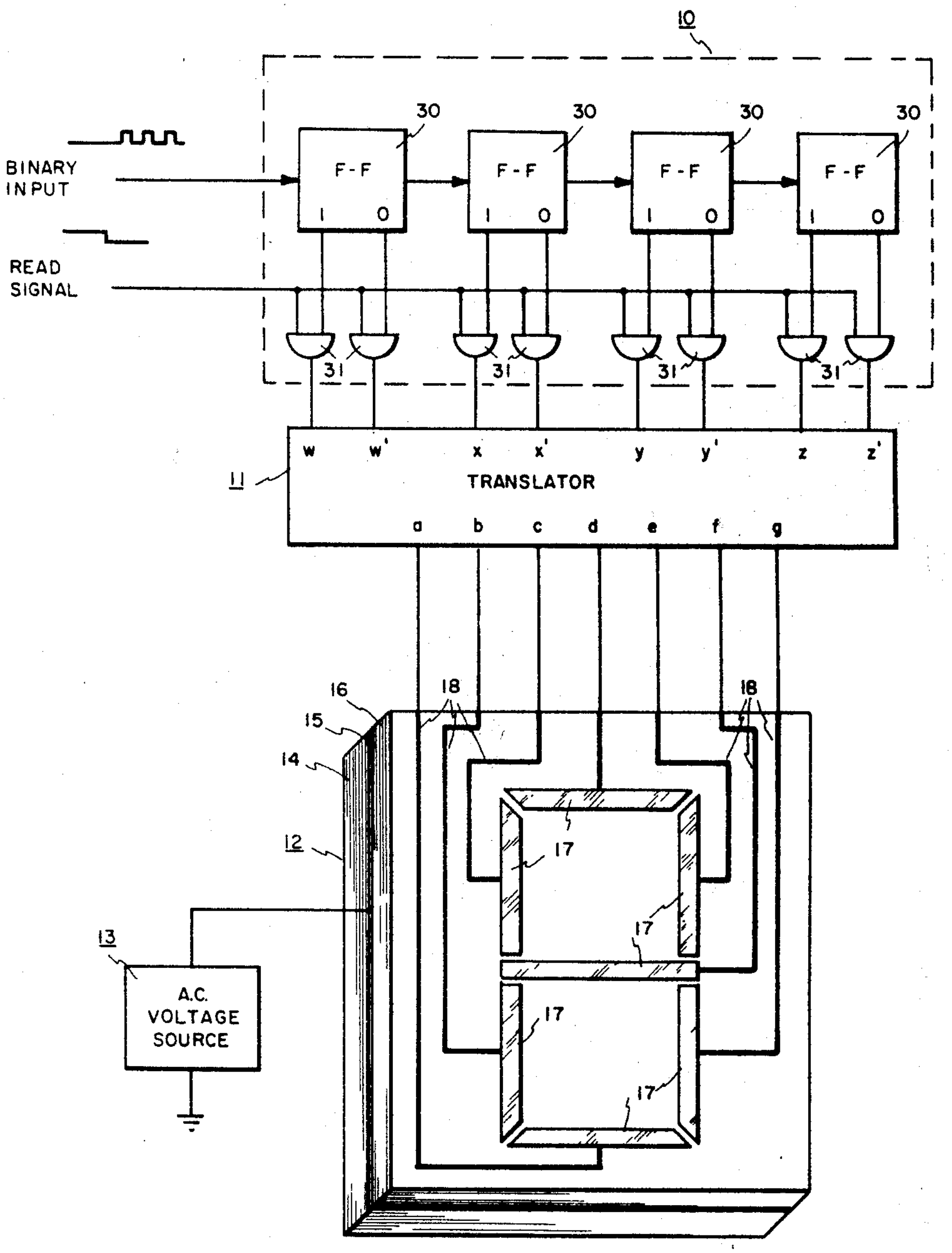

This invention relates to a translator for transforming a binary-coded input signal into a read-out signal for controlling an alpha-numeric display device.

The present interest in alpha-numeric display devices of the type wherein the selective energization of an electro-luminescent cell having a segmented electrode pattern is used to provide visual information has generated a corresponding interest in decoding matrices and driving circuits for these devices. In general, the information to be displayed is in binary-coded form wherein the presence or absence of voltage levels denote the letter or number to be shown. The binary signal is transformed by a translator to provide a read-out signal which results in only certain segments of the display device being energized.

One form of display device commonly employed is an electroluminescent cell having a first transparent large area electrode, an electroluminescent layer formed thereon, and a plurality of electrode segments in a figure-8 pattern deposited thereover. When an A-C voltage is applied between the first electrode and selected electrode segments, the portion of the electroluminescent layer therebetween emits light and an alpha-numeric character is portrayed. One such device and its construction is shown in U.S. Patent 2,958,009 to E. R. Bowerman, Jr.

Although the display device itself is of generally simple construction, the associated translating and driving circuits, while performing in an acceptable manner, are relatively complex and expensive due primarily to the number of electrical components therein.

Accordingly an object of the present invention is to provide a binary to alpha-numeric translator suitable for controlling an electroluminescent display device and employing fewer components than translators presently performing similar operations.

Another object is the provision of a translating circuit wherein the current level required for normal operation is minimized so that the need for driving amplifiers is obviated.

In accordance with the present invention, a translator is provided which employs generally three logic or decoding matrices connected in series. The translator further includes a plurality of input terminal pairs with each of the pairs corresponding to a single digit in the binary code employed. Each pair of terminals is coupled to a storage device, such as a flip-flop, with the state of the storage device being determined by the digit supplied thereto. Depending on the state of the storage device, one terminal of the pair is at a high voltage level with the other at a low voltage level.

The first logic matrix has a plurality of inputs which are coupled to predetermined translator input terminals. This matrix has a plurality of outputs which in turn are coupled to a second logic matrix. The presence of high voltage levels, generally of the order of a few volts D.C., at particular translator input terminals results in the flow of current at predetermined outputs of the first logic matrix. This matrix may be considered as a current source under logic control in that current is provided at certain outputs in accordance with the binary-coded input signal.

The second matrix is comprised of a number of three terminal four-layer semiconductor elements, such as silicon-controlled rectifiers or SCR's. Each SCR has an anode, cathode and gate electrode. The gate electrodes of the SCR's are coupled to the outputs of the first logic matrix. The cathode electrodes of the SCR's are in turn coupled to a third logic matrix.

The anode electrodes of the SCR's are coupled to the translator output terminals which are then coupled through a high impedance, such as an electroluminescent phosphor layer, to one terminal of a suitable energizing source. The other terminal of said source is coupled to a reference potential, i.e. ground.

The third logic matrix is coupled to predetermined translator input terminals and to the second matrix. This matrix establishes low impedance conducting paths between the cathode electrodes of particular SCR's and the translator input terminals in accordance with the binary-coded signal. The matrix may be considered as a variable impedance under logic control in that a low impedance conducting path is provided for only certain SCR's as determined by the input signal.

The concurrent application of current at the gate electrode of one or more SCR's in the second matrix by the first logic matrix and the provision of a low impedance conducting path from the cathode of the same SCR's to the translator input terminals by the third logic matrix renders these SCR's conductive. The particular SCR's rendered conductive are determined by the binary-coded signal applied to the translator input terminals. When conductive, the impedance level appearing at the corresponding translator output terminals is substantially lowered so that essentially the entire voltage from the energizing source appears across a portion of the electroluminescent layer. This results in the emission of light therefrom. By coupling individual electrode segments of an electrode pattern to different translator output terminals, alpha-numeric characters can be readily displayed in accordance with the binary-coded input signal.

It will be noted that the SCR's in the second logic matrix of the present translator are connected in a series switching mode with the energizing voltage applied to the display device essentially appearing across the anode and cathode of the SCR when it is in its nonconductive state. The series mode effectively utilizes the low leakage current and low capacitance of an SCR and is found to enable the gate driving current to be substantially lower than that required in translators utilizing SCR's in a parallel switching mode. As used herein, a parallel mode operation relates to the use of SCR's to effectively short-out the unwanted segments. By reducing the driving currents, the need for individual transistor driving circuits with each SCR is eliminated. Also by employing three matrices of the type described, the number of electrical components in the translator is substantially reduced. Further discussion of the characteristics of an SCR coupled in series with a high impedance is contained in the copending patent application Ser. No.

378,639 filed June 29, 1964 by H. G. Blank and M. Fischman.

Figure 2:
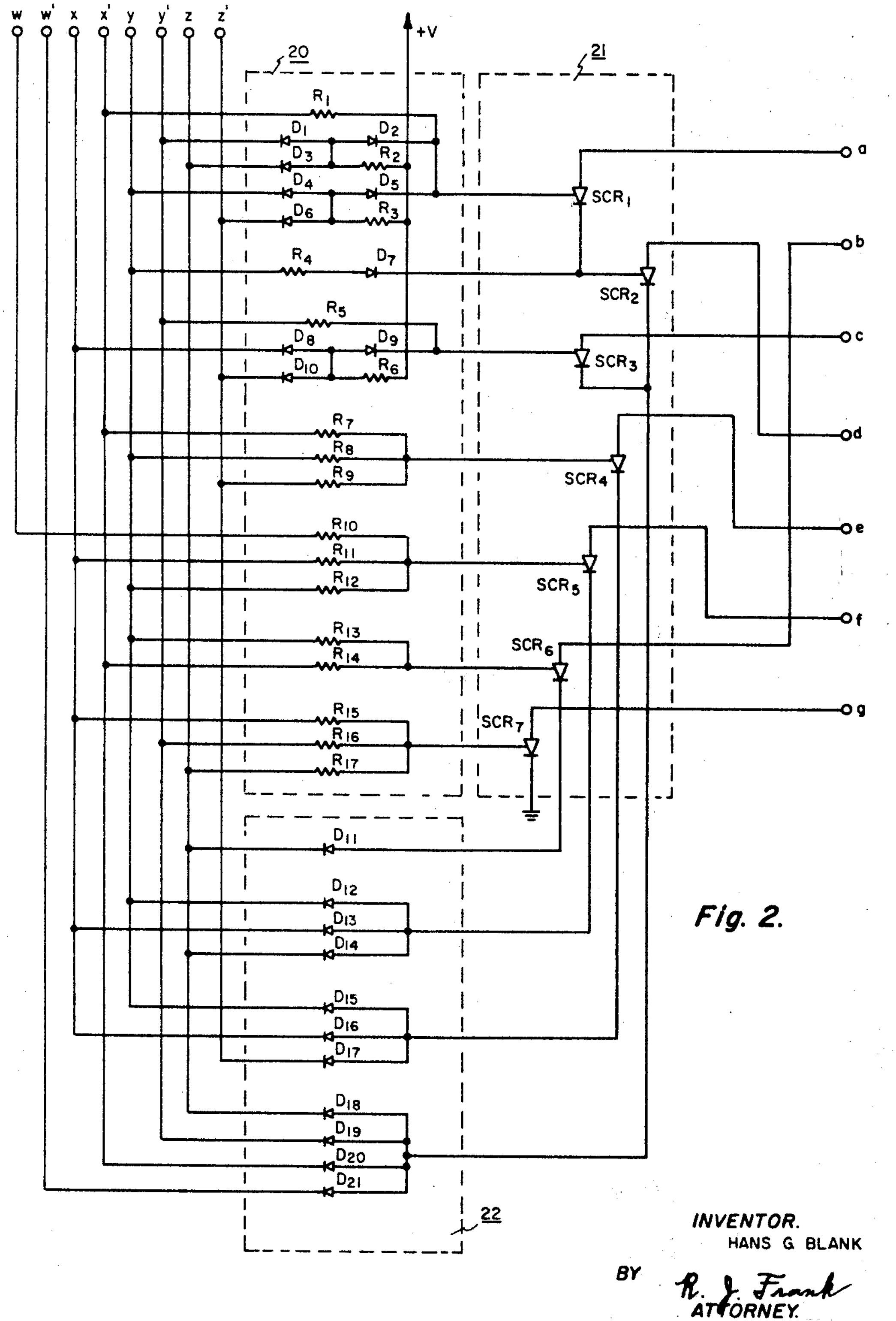

Further features and advantages of the present invention will become more readily apparent from the following description of a specific embodiment, in which:

FIG. 1 is a block diagram of a representative electroluminescent display device and the associated circuits, and FIG. 2 is a schematic diagram of one embodiment of the invention.

Referring now to FIG. 1, a display device is shown comprising a binary input signal register 10, a translator 11 for receiving the stored signal from register 10 and transforming this signal to a numeric read-out signal, an electroluminescent device 12 coupled to the output terminals of translator 11 and an A.C. voltage source 13 for energizing all or a portion of device 12.

Register 10 is further shown as containing a plurality of flip-flops 30 to which a binary signal is applied. Each flip-flop has two outputs labeled 1 and 0 with the 1 output being at a high voltage level, such as +6 volts, and the 0 output being at a low voltage level, such as 0, when the flip-flop has been set by the binary-coded signal. Further, each output is coupled to an "and" gate 31, so that the application of a read signal thereto as shown results in the parallel read-out of the register to translator 11. It will be noted that in this embodiment, the register stores a four bit binary word which is sufficient to control a single digit numeric display.

Translator 11 is provided with four pairs of input terminals with each pair being coupled to a corresponding flip-flop. If the least significant digit is present in the binary-coded signal, terminal *z* is at the high voltage level and terminal *z'* is at the low voltage level. The other terminal pairs are similarly controlled by corresponding digits. The translator transforms the combination of voltage levels read-in to a numeric code with the output appearing as a change in impedance level occurring at one or more of the output terminals *a* through *g*.

Electroluminescent device 12 comprises a glass substrate 14 having a large area transparent electrode 15 thereon, an electroluminescent phosphor layer 16 formed thereover and a segmented top electrode pattern 17. The individual electrode segments of pattern 17 are provided with corresponding conducting paths 18 which in turn are coupled to the output terminals of translator 11.

An A.C. voltage source 13 is shown coupled between large-area electrode 15 and a reference potential or ground. The electroluminescent device 13 emits light when a portion of the phosphor layer 16 is excited by an electric field. However, if the impedance level of the translator output terminals is substantially high, i.e., all conducting paths therefrom to ground are in effect non-conductive, the device emits no light since the portion of the voltage appearing across the phosphor layer is not sufficient to provide electroluminescence.

By lowering the impedance level at selected translator output terminals, corresponding segments of electrode 17 are in effect coupled through a relatively low impedance to ground thereby establishing an electric field sufficient to excite the portion of the phosphor thereunder. The segmented pattern of FIG. 1 can be used as a single digit numeric display, for example lowering the impedance of translator output terminals *a, b, d, e,* and *f* results in the digit 2 being displayed. The impedance across the phosphor layer of a typical device 12 is of the order of 10 megohms, while the impedance to ground of a conventional flip-flop is less than 10 kilohms. Therefore, providing a low impedance conducting path through translator 11 results in a substantial portion of the output of source 13 appearing across the phosphor layer.

The translator is shown in schematic form in FIG. 2 and includes a first logic matrix 20 coupled to predetermined translator input terminals *w, x,* etc. A second logic matrix 21 is coupled to the first matrix 20 and has a plurality of output terminals labeled *a* through *g* each of which is coupled to individual electrode segments of electrode pattern 17 of FIG. 1. In addition, a third logic matrix 22, also coupled to predetermined translator input terminals, is coupled to second matrix 21.

In the analysis of the operation of the translator, first matrix 20 may be considered as a current source under logic control and having a plurality of outputs. The provision of a current at particular outputs is determined by the binary-coded signal. The third matrix 22 may be considered as an impedance matrix under logic control whereupon the provision of a low impedance conducting path between certain of its outputs and the translator input terminals is determined by the binary-coded signal.

The second logic matrix 21 consists of a number of SCR's each of which has its anode electrode coupled to an individual electrode segment of pattern 17. These SCR's are in series with the segments and are rendered conductive by the concurrent provision of a gate current and a cathode conducting path. Thus, each SCR serves as a logic element while being under logic control by the other matrices.

Returning now to matrix 20, a plurality of diodes D and resistors R are connected to perform several logic functions. The direct coupling of an output of matrix 20 to the translator input terminals by a pulurality of resistors connected in parallel, for example resistors $R_7$, $R_8$, $R_9$, perform an "or" logic in that if one or more of the corresponding input terminals are at a high voltage level, current is supplied to the corresponding gate electrode of matrix 21.

In addition, the combination of oppositely poled diodes coupled to a conducting path containing a single diode and a resistor which in turn is connected to bias voltage +V perform an "and" function. For example, the combination of diodes $D_8$, $D_9$, $D_{10}$ and $R_6$ provide a current at the gate of $SCR_3$ only when both terminals *x* and *z'* are at the high voltage level to reverse bias diodes $D_8$ and $D_{10}$. When so biased, gate current is supplied through resistor $R_6$ and diode $D_9$. Also, resistor $R_5$ is connected between the gate electrode of $SCR_3$ and terminal *y'* so that a current is supplied to the gate of $SCR_3$ when either terminals *x* and *z'* or terminal *y'* are at a high voltage level. It will be noted that more than one "and" combination may be connected in parallel as shown by the gate circuit of $SCR_1$. The use of the above diode and resistor combinations results in the binary signal appearing at the translator input terminals coupling a current source to the gate electrode of selected SCR's of matrix 21.

The second matrix 21 is comprised of a number of three terminal four-layered semiconductor devices, $SCR_1$ through $SCR_7$. The anode of each SCR is connected to one of the translator output terminals *a* through *g* which in turn is coupled to an individual segment of the display. The gate electrode of each SCR is connected to matrix 20. In addition, the gate of $SCR_2$ is also connected to the cathode of $SCR_1$. The cathode electrodes of SCR's 2 through 6 are connected to matrix 22 with the exception of $SCR_7$ which is shown connected to a reference potential or ground.

Matrix 22, comprised of diodes $D_{11}$ through $D_{21}$, couples the cathodes of selected SCR's 2 through 6 to the translator input terminals. This matrix selectively establishes low impedance conducting paths between the translator input terminals and matrix 21. The parallel combination of diodes, for example diodes $D_{12}$, $D_{13}$, $D_{14}$, perform an "or" logic function in that a conductive path is established between the translator input terminals and the cathode of $SCR_5$ if either terminal *x, y,* or *z* are at the low voltage level. The application of the low voltage level at an input terminal serves to forward bias the corresponding diode. It will be noted that $SCR_6$ is coupled to a single terminal *z* by diode $D_{11}$.

The SCR's of matrix 21 may also be described in terms of logic functions. SCR's 3 through 6 perform "and" functions with respect to the outputs of matrices 20 and 22 since they are rendered conductive by the concurrence of a gate current supplied by matrix 20 and a cathode conductive path provided by matrix 22. Also SCR's 1 and 2 are interconnected to provide additional logic control with the cathode of $SCR_1$ being connected to the gate of $SCR_2$. When a gate current is supplied to $SCR_1$ by matrix 20, it in turn supplies a gate current to $SCR_2$ since the cathode of $SCR_1$ is connected to the gate of $SCR_2$.

The matrices are constructed such that a gate current only flows through $SCR_1$ under conditions wherein a cathode conductive path is provided for $SCR_2$. Thus, $SCR_1$ when rendered conductive provides the gate current which renders $SCR_2$ conductive. However it will be noted that $SCR_2$ may be conductive while $SCR_1$ is not. This is due to the coupling of the gate of $SCR_2$ to input terminal $y$ through resistor $R_4$ and diode $D_7$. In addition, it will be noted that the cathode paths of both $SCR_2$ and $SCR_3$ are similarly coupled to selected input terminals by matrix 22. In summary, $SCR_2$ is conductive when $SCR_1$ is conductive but $SCR_1$ may not be conductive when $SCR_2$ is conductive.

When one or more SCR's are rendered conductive by matrices 20 and 22, relatively low impedance conductive path is provided for the A.C. voltage connected in series therewith. Thus, the supply voltage is principally applied across the portion of the phosphor layer underlying the corresponding electrode segments of the electroluminescent device and thereby provides selective emission of light. The SCR's are operated in a series mode whereby the gate currents required to render the SCR's conductive may be maintained at a relatively low level to decrease the power requirements of the translator. Thus, the need for driving circuits in the translator is obviated.

In a typical operation, for example the display of the numeral 1, the binary signal 0001 is stored in flip-flops 30 with a read signal being applied to "and" circuits 31. This results in the translator input terminals $w'$, $x'$, $y'$ and $z$ being at the high voltage level for the duration of the read signal.

Returning to FIG. 2, the high voltage level at terminal $x'$ supplies a current to the gate electrodes of SCR's 1, 4 and 6. However, no conductive path is provided for SCR's 2 and 6 since the corresponding terminals $w'$, $x'$, $y'$ and $z$ are at a high voltage level which reverse biases the diodes to render the paths nonconductive. The high voltage level at terminal $y'$ provides a gate current for SCR's 3 and 7 and in combination with the high voltage level at terminal $z$ provides a gate current for $SCR_1$. However, $SCR_1$ is coupled to $SCR_2$ which in turn is coupled to the cathode of $SCR_3$ and as mentioned previously, no conductive path is provided therefor.

The presence of a high voltage level at terminals $y'$ and $z$ provides a current at the gate of $SCR_7$ which has its cathode coupled to ground. Thus, $SCR_7$ is rendered conductive. Although two terminals coupled to the gate of $SCR_7$ are at a high level, the resistors are selected so that a high voltage level appearing at one terminal provides suffiicent current to render an SCR conductive.

In addition, terminal $z'$ is at a low voltage level and establishes a conducting path between the cathode of $SCR_4$ and the input terminal. Therefore, SCR's 4 and 7 have been rendered conductive causing the A.C. supply voltage to appear across the portion of the electroluminescent layer underlying segments $g$ and $e$ of electrode pattern 17. As a result, the numeral 1 is depicted by the display device.

In one embodiment tested and operated using a 4 digit binary code input to provide a numeric display, the entire translator required but 21 diodes, 17 resistors and the 7 SCR's. When operated with a D.C. supply voltage +V of 6 volts, the current drain from the power supply was found to be less than 10 ma. and the current from the input signal lines did not exceed 7 ma.

While the above description has referred to a specific numeric embodiment, it will be apparent that many variations and modifications, including the provision of an alpha-numeric translator, may be made therein without departing from the spirit and scope of the invention.

What is claimed is:

1. Apparatus for transforming a coded input signal into an alpha-numeric read-out signal which comprises:

(a) a plurality of pairs of input terminals, each of said pairs corresponding to a individual digit in said coded signal;

(b) current means having a plurality of inputs coupled to predetermined input terminals and a plurality of outputs, said means providing current at selected outputs in accordance with said coded signal;

(c) a logic matrix comprising a plurality of four-layer semiconductor elements each having anode, cathode and gate electrodes, said gate electrodes being coupled to the outputs of said current means:

(d) impedance means coupled to the cathode electrodes of semiconductor elements for selectively establishing a low impedance conducting path therethrough in accordance with said coded signal, and (e) a plurality of output terminals coupled to the anode electrodes of said semiconductor elements, the concurrence of a gate current and said conducting path at the cathode of individual semiconductor elements rendering said individual elements conductive whereby a read-out signal is provided at said output terminals.

2. Apparatus for transforming a coded input signal into an alpha-numeric read-out signal which comprises:

(a) a plurality of pairs if input terminals, each of said pairs corresponding to an individual digit in said coded signal;

(b) current means having a plurality of inputs coupled to predetermined input terminals and a plurality of outputs, said means providing current at selected outputs in accordance with said coded signal;

(c) a logic matrix comprising a plurality of four-layer semiconductor elements each having anode, cathode and gate electrodes, said gate electrodes being coupled to the outputs of said current means;

(d) impedance means having a plurality of inputs coupled to predetermined input terminals, said means being coupled to the cathode electrodes of said semiconductor elements for selectively establishing a low impedance conducting path therethrough in accordance with said coded signal, and (e) a plurality of output terminals coupled to the anode electrodes of said semiconductor elements, the concurrence of a gate current and said conducting path at the cathode of individual semiconductor elements rendering said individual elements conductive whereby a read-out signal is provided at said output terminals.

3. Apparatus for transforming a binary-coded input signal into a read-out signal for controlling a display device of the type wherein an energizing source is connected in series therewith which comprises:

(a) a plurality of pairs of input terminals, each of said pairs corresponding to an individual digit in said binary-coded input signal;

(b) current means having a plurality of inputs coupled to predetermined input terminals and a plurality of outputs, said means providing current at selected outputs thereof in accordance with said binary-coded signal;

(c) a logic matrix comprising a plurality of four-layer semiconductor elements coupled in series with said display device and energizing source, said elements each having anode, cathode and gate electrodes with said anode electrodes being coupled to said display device and said gate electrodes being coupled to the outputs of said current means; and (d) impedance means having a plurality of inputs coupled to predetermined input terminals, said means being coupled to predetermined cathode electrodes of said semiconductor elements for establishing low impedance conducting paths in series with said semiconductor elements in accordance with said binary-coded signal, the concurrence of a gate current and said conducting path at the cathode of individual semiconductor elements rendering said individual elements conductive whereby said display is energized in accordance with said binary-coded signal.

4. Apparatus for transforming a binary-coded input signal into a read-out signal for controlling a display device of the type wherein an energizing source is connected in series therewith which comprises:

(a) a plurality of pairs of input terminals, each of said pairs corresponding to an individual digit in said binary-coded signal;

(b) current means having a plurality of inputs coupled to predetermined input terminals and a plurality of outputs, said means providing current at selected outputs thereof in accordance with said binary-coded signal;

(c) a logic matrix comprising a plurality of four-layer semiconductor elements coupled in series with said display device and energizing source, said elements each having anode, cathode and gate electrodes with said anode electrodes being coupled to said display device and said gate electrodes being coupled to an individual output of said current means, at least one element having its cathode electrode coupled to the gate electrode of another of said elements; and (d) impedance means having a plurality of inputs coupled to predetermined input terminals, said means being coupled to the cathode electrodes of said semiconductor elements for selectively establishing low impedance conducting paths in series with said semiconductor elements in accordance with said binary-coded signal, the concurrence of a gate current and said conducting path at the cathode of individual semiconductor elements rendering said individual elements conductive whereby said display is energized in accordance with said binary-coded signal.

5. Apparatus for transforming a binary-coded input signal into a read-out signal for controlling a display device of the type wherein an energizing source is connected in series therewith which comprises:

(a) a plurality of pairs of input terminals, each of said pairs corresponding to an individual digit in said binary-coded signal, one terminal of each pair being at a high voltage level in accordance with said input signal;

(b) current means having a plurality of inputs coupled to predetermined input terminals and a plurality of outputs, said means providing current at selected outputs thereof in response to said binary-coded signal;

(c) a logic matrix comprising a plurality of four-layer semiconductor elements coupled in series with said display device and energizing source, said elements each having anode, cathode and gate electrodes with said anode electrodes being coupled to said display device and said gate electrodes being coupled to an individual output of said current means, at least one element having its cathode electrode coupled to the gate electrode of another of said elements and at least two of said elements having their cathode electrodes coupled together; and (d) impedance means having a plurality of inputs coupled to predetermined input terminals, said means being coupled to the cathode electrodes of said semiconductor elements for selectively establishing a low impedance conducting path in series with said semiconductor elements in accordance with said binary-coded signal, the concurrence of a gate current and said conducting path at the cathode of individual semiconductor elements rendering said individual elements conductive whereby said display is energized in accordance with said binary-coded signal.

6. Apparatus for transforming a binary-coded input signal into an alpha-numeric read-out signal which comprises:

(a) a plurality of pairs of input terminals, each of said pairs corresponding to an individual digit in said binary-coded signal, one terminal of each pair being at a high voltage level in accordance with said input signal;

(b) a first logic matrix having a plurality of inputs coupled to predetermined input terminals and a plurality of outputs, said first matrix providing current at individual outputs thereof in accordance with said binary-coded signal;

(c) a second logic matrix comprising a plurality of four-layer semiconductor elements each having anode, cathode and gate electrodes, said gate electrodes being coupled to the outputs of said first matrix;

(d) a third logic matrix having a plurality of inputs coupled to predetermined input terminals and a plurality of outputs coupled to the cathode electrodes of said semiconductor elements, said third matrix selectively establishing a low impedance conducting path therethrough in accordance with said binary-coded signal, and (e) a plurality of output terminals coupled to the anode electrodes of said semiconductor elements, the concurrence of a gate current and a cathode conducting path of individual semiconductor elements rendering said individual elements conductive whereby a read-out signal is provided at said output terminals.

7. Apparatus for transforming a binary-coded input signal into an alpha-numeric read-out signal which comprises:

(a) a plurality of pairs of input terminals, each of said pairs corresponding to an individual digit in said binary-coded signal, one terminal of each pair being at high voltage level in accordance with said input signal;

(b) a first logic matrix having a plurality of inputs coupled to predetermined input terminals and a plurality of outputs, said first matrix providing current at individual outputs thereof in accordance with said binary-coded signal;

(c) a second logic matrix comprising a plurality of four-layer semiconductor elements each having anode, cathode and gate electrodes, said gate electrode being coupled to an individual output of said first matrix, at least one element having its cathode electrode coupled to the gate electrode of another of said elements and at least two of said elements having their cathode electrodes coupled together; and (d) a third logic matrix having a plurality of inputs coupled to predetermined input terminals and a plurality of outputs coupled to the cathode electrodes of said semiconductor elements, said third matrix selectively establishing a low impedance conducting path therethrough in accordance with said binary-coded signal; and (e) a plurality of output terminals coupled to the anode electrodes of said semiconductor elements, the concurrence of a gate current and a cathode conducting path of individual semiconductor elements rendering said individual elements conductive whereby a read-out signal is provided at said output terminals.

8. A display device for providing a light output in response to a binary-coded input signal which comprises:
(a) an electroluminescent display device having a plurality of electrode segments and a large area electrode;
(b) an energizing voltage connected between said large area electrode and a reference potential;
(c) a plurality of pairs of input terminals, each of said pairs corresponding to an individual digit in said binary-coded signal;
(d) current means having a plurality of inputs coupled to predetermined input terminals and a plurality of outputs, said means providing current at selected outputs in accordance with said binary-coded signal;
(e) a logic matrix comprising a plurality of four-layer semiconductor elements coupled in series with said electroluminescent cell, said elements each having anode, cathode and gate electrodes with said anode electrodes being coupled to individual segments of said cell and said gate electrodes being coupled to the outputs of said current means; and
(f) impedance means coupled to the cathode electrodes of said semiconductor elements for selectively establishing low impedance conductive paths between said cathode electrodes and said reference potential in accordance with said binary-coded signal, the concurrence of a gate current and said conducting path at the cathode of individual semiconductor elements rendering said individual elements conductive whereby corresponding portions of said cell are energized to emit light.

References Cited

UNITED STATES PATENTS

| | | | |
|---|---|---|---|
| 3,147,469 | 9/1964 | Buchsbaum | 340—336 |
| 3,292,036 | 12/1966 | Colton et al. | 340—324 |
| 3,293,416 | 12/1966 | Chisholm et al. | 295—92 |
| 3,307,171 | 2/1967 | Claessen | 340—324 |
| 3,219,865 | 11/1965 | Vodicka | 340—324 |

JOHN W. CALDWELL, *Primary Examiner.*

A. J. KASPER, *Assistant Examiner.*